US012676351B2

(12) United States Patent
Werner et al.

(10) Patent No.: US 12,676,351 B2
(45) Date of Patent: Jul. 7, 2026

(54) METHOD FOR RECOVERING VALUABLE MATERIALS FROM BATTERIES

(71) Applicant: University of Kentucky Research Foundation, Lexington, KY (US)

(72) Inventors: Joshua Werner, Sadieville, KY (US); Lucas Bertucci, Louisville, KY (US); Yang-Tse Cheng, Lexington, KY (US); Jack Groppo, Nicholasville, KY (US); Matthew Weisenberger, Lawrenceburg, KY (US)

(73) Assignee: University of Kentucky Research Foundation, Lexington, KY (US)

( * ) Notice: Subject to any disclaimer, the term of this patent is extended or adjusted under 35 U.S.C. 154(b) by 403 days.

(21) Appl. No.: 18/224,263

(22) Filed: Jul. 20, 2023

(65) Prior Publication Data
US 2025/0030074 A1      Jan. 23, 2025

(51) Int. Cl.
*H01M 10/54*      (2006.01)
*C22B 1/02*       (2006.01)
(Continued)

(52) U.S. Cl.
CPC .............. *H01M 10/54* (2013.01); *C22B 1/02* (2013.01); *C22B 3/22* (2013.01); *C22B 3/44* (2013.01);
(Continued)

(58) Field of Classification Search
CPC ..... C22B 7/008; C22B 15/0078; C22B 19/24; C22B 23/0446; C22B 26/12; H01M 6/52; H01M 10/54; Y02P 10/20; Y02W 30/84
See application file for complete search history.

(56) References Cited

U.S. PATENT DOCUMENTS

| | | | |
|---|---|---|---|
| 11,682,801 B1 * | 6/2023 | Salazar ................. | C22B 23/043 |
| | | | 75/403 |
| 2018/0013181 A1 * | 1/2018 | Ho .......................... | H01M 6/52 |
| 2024/0003019 A1 * | 1/2024 | Gao ......................... | C22B 1/02 |

FOREIGN PATENT DOCUMENTS

CA      3156394 A1 *   5/2021   ............. C22B 26/12

OTHER PUBLICATIONS

Wang, Hongyan et al. Recovery of Lithium, Nickel, and Cobalt from Spent Lithium-Ion Battery Powders by Selective Ammonia Leaching and an Adsorption Separation System. ACS Sustainable Chemistry & Engineering. 5. 1489-11495. https://doi.org/10.1021/acssuschemeng.7b02700 (Year: 2017).*
(Continued)

*Primary Examiner* — Tima M. Mcguthry-Banks
(74) *Attorney, Agent, or Firm* — Stites & Harbison PLLC; Warren D. Schickli

(57)      ABSTRACT

A method of recycling batteries includes steps of: shredding the batteries to generate a shredded battery feed material, wetting the shredded battery feed material with an ammonia carbonate lixiviant to generate a slurry, separating the battery feed material in the slurry into a relatively light fraction material slurry and a relatively heavy fraction material slurry, processing the relatively light fraction material slurry in a first counter current ammoniacal leaching and decanting circuit to produce a first pregnant leaching solution including a soluble lithium (Li) component, and processing the relatively heavy fraction material slurry in a second counter current ammoniacal leaching and decanting circuit to produce a second pregnant leaching solution including, if present in the batteries, soluble nickel (Ni), cobalt (Co), zinc (Zn) and copper (Cu) components and insoluble graphite, iron (Fe), aluminum (Al), manganese (Mn) and rare earth element (REEs) components.

20 Claims, 1 Drawing Sheet

(51) Int. Cl.

| | |
|---|---|
| *C22B 3/00* | (2006.01) |
| *C22B 3/22* | (2006.01) |
| *C22B 3/44* | (2006.01) |
| *C22B 7/00* | (2006.01) |
| *C22B 15/00* | (2006.01) |
| *C22B 26/12* | (2006.01) |
| *H01M 6/52* | (2006.01) |

(52) U.S. Cl.
CPC .......... *C22B 7/008* (2013.01); *C22B 15/0021* (2013.01); *C22B 15/0078* (2013.01); *C22B 15/0086* (2013.01); *C22B 15/0089* (2013.01); *C22B 19/24* (2013.01); *C22B 23/0446* (2013.01); *C22B 23/0453* (2013.01); *C22B 26/12* (2013.01); *H01M 6/52* (2013.01); *Y02P 10/20* (2015.11); *Y02W 30/84* (2015.05)

(56) References Cited

OTHER PUBLICATIONS

Ma, Yayun et al. A promising selective recovery process of valuable metals from spent lithium ion batteries via reduction roasting and ammonia leaching. Journal of Hazardous Materials. 402. 123491. 11 pages. https://doi.org/10.1016/j.jhazmat.2020.123491 (Year: 2020).*

Yu, Jiancheng et al. Separation and Recovery of Valuable Metals from Ammonia Leaching Solution of Spent Lithium-Ion Batteries. ACS Sustainable Chem. Eng. 11, 9738-9750. https://doi.org/10.1021/acssuschemeng.3c01714 (Year: 2023).*

CN 111286605 A machine translation and original document. (Year: 2020).*

CN 114291854 A machine translation and original document. (Year: 2022).*

CN 116354408 A machine translation and original document. (Year: 2023).*

\* cited by examiner

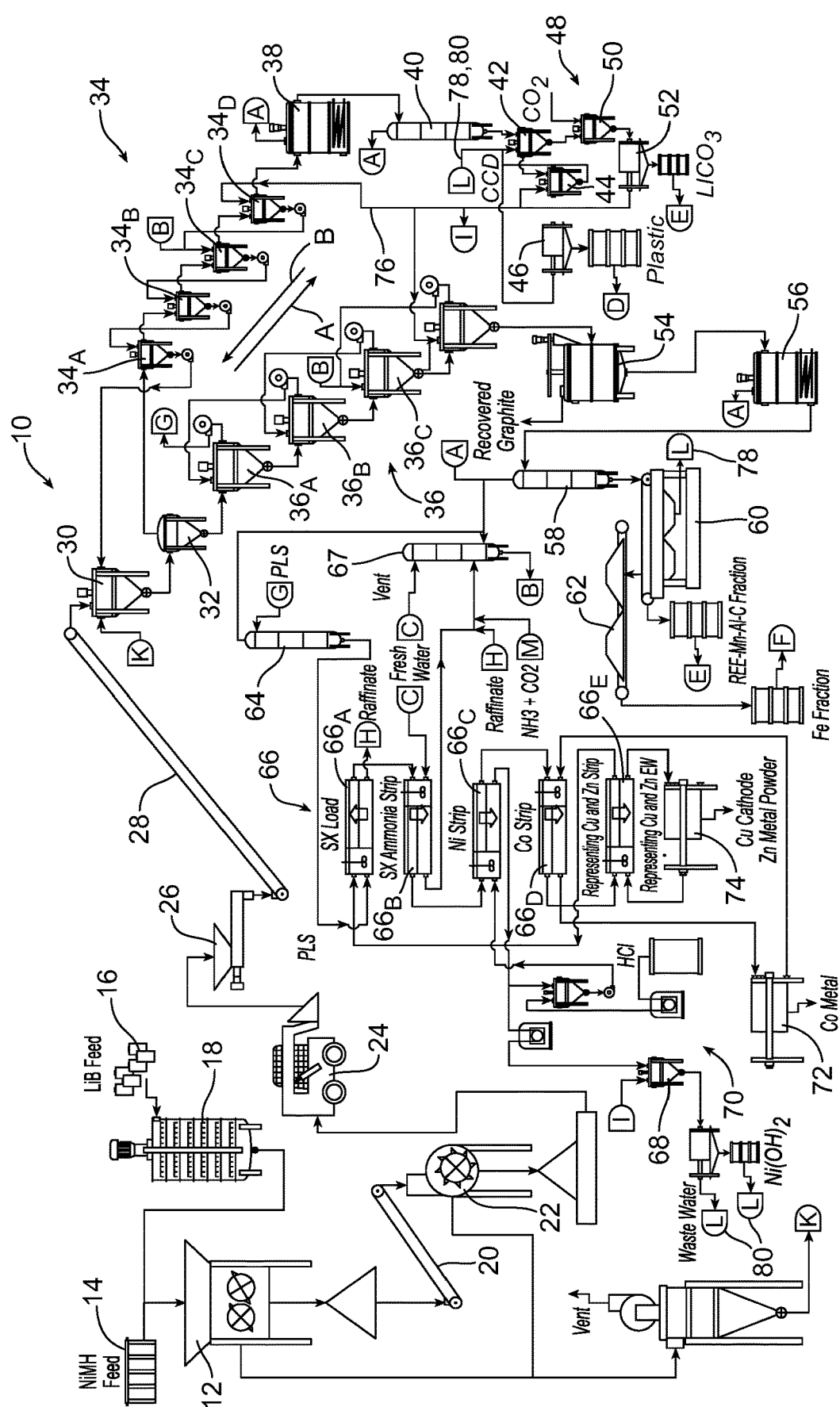

METHOD FOR RECOVERING VALUABLE MATERIALS FROM BATTERIES

TECHNICAL FIELD

This document generally relates to the recycling field and, more particularly, to a new and improved method and apparatus for recovering valuable materials from batteries in a cost effective and environmentally friendly manner.

BACKGROUND

Within the past decade, HEV models have been offered with one of two primary battery chemistries—Nickel Metal Hydride (NiMH) and Lithium-Ion (Li-Ion). However, from 1999 to the 2010 production year, NiMH batteries were the only chemistry available for use in HEVs, accounting for just shy of 1,887,000 units, from 9 independent manufacturers. Starting with 2012 model year HEVs, all manufacturers, with the exception of Toyota, began the process of phasing-out NiMH battery use in all then-current production vehicles (preferring LiB chemistry), and switched to LiB or Li—Po batteries for all future (new) HEV models. As noted, Toyota is the sole exception to this trend, continuing to offer at least one variant of every production model HEV with a NiMH battery.

Currently, there are two main methods of purifying metals of value from batteries: pyrometallurgical (pyro) and hydrometallurgical (hydro) processes. Pyro-processes are generally considered to be more cost effective and, depending on the category, lower than hydro-processes in environmental impact. Unfortunately, pyro-processes are plagued by two very significant shortcomings: that is, they result in (a) the loss of lithium and (b) the destruction of graphite. To overcome some of these difficulties various hydro-metallurgical approaches have been proposed to improve elemental recoveries.

This document discloses a new and improved process for recovering valuable materials from batteries in a cost effective and environmentally friendly manner. Advantageously, unlike the pyro-processes of the prior art. the valuable materials that are recovered also include lithium and graphite.

SUMMARY

In accordance with the purposes and benefits sets forth herein, a new and improved method and apparatus are provided for recovering valuable materials from batteries including, but not necessarily limited to, nickel metal hydride (NiMH) and lithium-ion (Li-Ion) batteries. Advantageously, the different types of batteries may be processed alone or together.

The method of recycling batteries may be said to comprise, consist of or consist essentially of the steps of: (a) shredding the batteries to generate a shredded battery feed material, (b) wetting the shredded battery feed material with an ammonia carbonate lixiviant to generate a slurry, (c) separating the battery feed material in the slurry into a relatively light fraction material slurry and a relatively heavy fraction material slurry, (d) processing the relatively light fraction material slurry in a first counter current ammoniacal leaching and decanting circuit to produce a first pregnant leaching solution including a soluble lithium (Li) component, and (e) processing the relatively heavy fraction material slurry in a second counter current ammoniacal leaching and decanting circuit to produce a second pregnant leaching solution including, if present in the batteries, soluble nickel (Ni), cobalt (Co), zinc (Zn) and copper (Cu) components and insoluble graphite, iron (Fe), aluminum (Al), manganese (Mn) and rare earth element (REEs) components.

In one or more of the many possible embodiments, the method may include removing ammonia from the first pregnant leaching solution downstream from the first leaching and decanting circuit. Removing of the ammonia may be performed by first heating the first pregnant leaching solution to evaporate the ammonia. This does not preclude staged or sequential removal of ammonia by evaporation.

The method may include precipitating the lithium component from the first pregnant leaching solution as lithium carbonate in a lithium precipitation circuit and filtering the lithium carbonate from the first pregnant leaching solution. Still further, the method may include separating the relatively light solid plastics from the first pregnant leaching solution before the precipitating of the lithium component.

In one or more embodiments, the method may include removing ammonia from the second pregnant leaching solution by first heating the lixiviant to evaporate the ammonia and then removing residual ammonia following evaporation. In one or more embodiments, the method includes separating the relatively light graphite from the second pregnant leaching solution before the removing of the ammonia.

In at least some embodiments, the method further includes one or more of the following steps: (a) using floatation for the separating of the graphite from the heavy fraction material in the lixiviant, (b) filtering or settling solid materials from the second pregnant leaching solution, (c) using magnetic separation to separate iron-rich components from other solid materials including aluminum, manganese and rare earth element components, (d) removing further ammonia from the second pregnant leaching solution to lower the pH to a value of between about 7 and about 10.5 and then subjecting the second pregnant leaching solution to solvent extraction to sequentially extract the nickel component, the cobalt component, the copper component and the zinc component, (e) stripping the nickel component from the second pregnant leaching solution with acid. In an embodiment subsequent neutralization to produce nickel hydroxide and filtering the nickel hydroxide from the second pregnant leaching solution may be considered, (f) electrowinning cobalt metal from the cobalt component extracted from the second pregnant leaching solution and (g) stripping the copper component and the zinc component from the second leaching solution with acid (e.g. sulfuric acid ($H_2SO_4$)) and (h) electrowinning copper and zinc metal from the copper component and the zinc component extracted from the second leaching solution. In embodiment, those skilled in the art may determine to recover metals by electrowinning or precipitation as selected.

In at least some embodiments, including particularly those for the processing of lithium ion batteries, the method further includes subjecting the lithium ion batteries to reductive roasting prior to the wetting of the shredded battery feed material with an ammonia carbonate lixiviant. That reductive roasting may include heating the lithium ion batteries to a temperature of between about 450° C. and 850° C. for a duration of time until the lithium ion batteries cease generating gasses.

Still further, the method may include one or more of the following steps: (a) recirculating the first pregnant leaching solution to the first counter current ammoniacal leaching and decanting circuit following the filtering of the lithium carbonate from the first pregnant leaching solution, (b) recirculating the second pregnant leaching solution to the lithium precipitating circuit following the filtering of the solid materials from the second pregnant leaching solution, (c) recirculating the second pregnant leaching solution to the lithium precipitating circuit following the filtering of the nickel hydroxide from the second pregnant leaching solution and (d) returning the ammonia removed from the first and second pregnant leaching solutions to the first and second counter current ammoniacal leaching and decanting circuits.

In accordance with an additional aspect, an apparatus for recycling batteries, comprises, consists of or consists essentially of: (a) a shredder for shredding the batteries and generating a shredded battery feed material, (b) a wetting tank for wetting the shredded battery feed material with an ammonia carbonate lixiviant to generate a slurry, (c) a settling tank adapted for separating the battery feed material in the slurry into a relatively light fraction material slurry and a relatively heavy fraction material slurry, (d) a first counter current ammoniacal leaching and decanting circuit for processing the relatively light fraction material slurry to produce a first pregnant leaching solution including a soluble lithium (Li) component, and (e) a second counter current ammoniacal leaching and decanting circuit for processing the relatively heavy fraction material slurry to produce a second pregnant leaching solution including, if present in the batteries, soluble nickel (Ni), cobalt (Co), zinc (Zn) and copper (Cu) components and insoluble graphite, iron (Fe), aluminum (Al), manganese (Mn) and rare earth element (REEs) components.

In one or more of the many possible embodiments, the apparatus further includes a roaster adapted for reductive roasting of lithium-ion batteries prior to wetting the materials with lixiviant. In some embodiments, the apparatus, further includes a first pre-heater for heating the first pregnant leaching solution, received from the first leaching and decanting circuit, to evaporate the ammonia and a first ammonia stripper for stripping residual ammonia following evaporation. In some embodiments, the apparatus further includes a lithium precipitation circuit for precipitating the lithium component from the first pregnant leaching solution as lithium carbonate and a filter for filtering the lithium carbonate from the first pregnant leaching solution.

In at least one embodiment, the apparatus includes a first separator upstream from the lithium precipitation circuit for separating solid plastics from the first pregnant leaching solution before the precipitating of the lithium component. In at least one embodiment, the apparatus includes a second pre-heater for heating the second pregnant leaching solution, received from the second leaching and decanting circuit, to evaporate the ammonia and a second ammonia stripper for stripping residual ammonia following evaporation. In at least one embodiment, the apparatus includes a second separator for separating graphite from the second pregnant leaching solution before evaporating the ammonia.

The apparatus may also include one or more of the following: (a) a filter for filtering insoluable or solid materials from the second pregnant leaching solution, (b) a magnetic separator for separating iron-rich components from other solid materials including aluminum, manganese, and rare earth element, (c) a solvent extraction circuit to sequentially extract the nickel component, the cobalt component, the copper component and the zinc component from the second pregnant leaching solution, and (d) a stripper for removing further ammonia from the second pregnant leaching solution to lower the pH to a value of between about 7 and about 10.5 prior to subjecting the second pregnant leaching solution to solvent extraction in the solvent extraction circuit.

Still further, the apparatus may also include one or more of the following: (a) a condenser absorber adapted for returning the ammonia evaporated from the first and second pregnant leaching solutions to the first and second counter current ammoniacal leaching and decanting circuits, (b) a first recycling circuit for recirculating the first pregnant leaching solution to the first counter current ammoniacal leaching and decanting circuit following the filtering of the lithium carbonate from the first pregnant leaching solution, (c) a second recycling circuit for recirculating the second pregnant leaching solution to the lithium precipitating circuit following the filtering of the solid materials from the second pregnant leaching solution, and (d) a third recycling circuit for recirculating the second pregnant leaching solution to the lithium precipitating circuit following filtering of nickel hydroxide from the second pregnant leaching solution.

In the following description, there are shown and described several different embodiments of the new and improved method and apparatus for recovering valuable materials from batteries. As it should be realized, that method and apparatus are capable of other, different embodiments and their several details are capable of modification in various, obvious aspects all without departing from the device and method as set forth and described in the following claims. Accordingly, the drawings and descriptions should be regarded as illustrative in nature and not as restrictive.

BRIEF DESCRIPTION OF THE DRAWING FIGURES

The accompanying drawing FIGURES incorporated herein by reference and forming a part of the specification, illustrate several aspects of the new and improved method and apparatus for recovering valuable materials from batteries and together with the description serve to explain certain principles thereof.

FIG. 1 is a schematic illustration of the method and apparatus.

Reference will now be made in detail to the present preferred embodiments of the method and apparatus for recycling batteries.

DETAILED DESCRIPTION

Reference is now made to FIG. 1 which schematically illustrates the method and apparatus 10 for recycling batteries, including, but not necessarily limited to NiMH batteries, Li-Ion batteries and a combination of NiMH and Li-Ion batteries. The apparatus 10 includes a coarse shredder 12 for the coarse shredding of NiMH batteries received from the NiMH battery feed source 14. If Li-Ion batteries are to be processed, those batteries are fed from the Li-Ion battery source 16 to a roaster 18 for reductive roasting before being transferred to the coarse shredder 12. The reductive roasting includes heating the Li-Ion batteries to a temperature of between about 450° C. and 700° C. for a duration of time until the Li-Ion batteries cease generating gasses and are rendered inert for further processing.

The coarse shredded batteries, having a particle size generally of between about 2 micron and about 20 millimeters, are then fed to a conveyor 20 for delivery to a downstream fine shredder 22 adapted to further shred the battery fed stream to a particle size of generally between about 1 micron and about 5 millimeters. The finely shredded battery feed stream, having an increased surface-to-volume ratio, is then transferred by skid steer 24, or other means, to a metering device 26, of a type known in the art, that is adapted to feed the finely shredded battery feed stream onto a conveyor 28 for delivery to a wetting tank 30. Wetting tank 30 functions to wet the finely shredded battery feed material with an ammonia carbonate lixiviant to generate a slurry. Advantageously, ammonia carbonate allows for the selective leaching of Ni, Co, Zn and Cu without leaching Fe, Al, Mn or REEs. The ammonia carbonate lixiviant also has a desired specific gravity of between about 1 and about 2 allowing for the separation of the light plastics and lithium component from the other materials as described in greater detail below.

After wetting, the slurry is delivered to a settling tank 32, such as described in U.S. Pat. No. 11,207,614, which has the ability to both leach and perform solid/liquid separations at the same time. Such a settling tank 32 is adapted for separating the battery feed material in the slurry into a first or relatively light fraction material slurry, including the soluble lithium component, and a second or relatively heavy fraction material slurry, including the other soluble metal components and the insoluble solids. The first or relatively light fraction material slurry is then delivered to a first counter current ammoniacal leaching and decanting circuit, generally designated by reference numeral 34, while the second or relatively heavy fraction material slurry is delivered to a second counter current ammoniacal leaching and decanting circuit, generally designated by reference numeral 36.

The first or relatively light leaching and decanting circuit 34 is adapted for processing the relatively light fraction material slurry to produce a first pregnant leaching solution including a soluble lithium (Li) component. In contrast, the leaching and decanting circuit 36 is adapted for processing the relatively heavy fraction material slurry to produce a second pregnant leaching solution including, if present in the batteries being processed, soluble nickel (Ni), cobalt (Co), zinc (Zn) and copper (Cu) components and insoluble graphite, iron (Fe), aluminum (Al), manganese (Mn) and rare earth element (REEs) components. As illustrated in FIG. 1, the circuit 34 includes four leaching tanks $34_A$-$34_D$ and the circuit 36 includes four leaching tanks $36_A$-$36_D$. Here, it should be appreciated that the circuits 34 and 36 may include fewer or more tanks as desired. The circuits 34, 36 also do not need to include the same number of tanks.

In the first counter current ammoniacal leaching and decanting circuit 34, the first or relatively light fraction material slurry is delivered from the settling tank 32 to the tank $34_A$ and then moves, as the light fraction, in the direction of action arrow A serially from the tank $34_A$ to the tank $34_B$, then to the tank $34_C$ and then to the tank $34_D$ while the recycled lixiviant moves, as the heavy fraction, in the opposite direction (note action arrow B) serially from the tank $34_D$ to the tank $34_C$, then to the tank $34_B$ and then to the tank $34_A$ before being pumped back to the wetting tank 30.

In the second counter current ammoniacal leaching and decanting circuit 36, the second or relatively heavy fraction material slurry is delivered from the settling tank 32 to the tank $36_A$ and then moves, as the heavy fraction, in the direction of action arrow A serially from the tank $36_A$ to the tank $36_B$, then to the tank $36_C$ and then to the tank $36_D$ while the recycled lixiviant moves, as the light fraction, in the opposite direction (note action arrow B) serially from the tank $36_D$ to the tank $36_C$, then to the tank $36_B$ and then to the tank $36_A$.

The first pregnant leaching solution exiting the tank $34_D$ of the first counter current ammoniacal leaching and decanting circuit 34 is then delivered (a) to a first pre-heater 38, adapted for heating the first pregnant leaching solution to evaporate the ammonia and then (b) to a first ammonia stripper 40 adapted to remove residual ammonia from the first pregnant leaching solution.

Next, the first pregnant leaching solution less ammonia, is delivered to a separator 42 adapted for separating the relatively light plastics from the leaching solution including the lithium component. The lighter fraction with the plastics then undergoes further separation in the separator 44 and then the plastics are recovered by the filter 46. Leaching solution, minus the plastics, is returned to the tank 42 where the heavier fraction of the first pregnant leaching solution is delivered to a lithium precipitation circuit, generally designated by reference numeral 48. This is done to ensure no loss of the lithium component.

The lithium precipitation circuit 48, including mixing tank 50 and filter 52, is adapted for precipitating the lithium component from the first pregnant leaching solution as lithium carbonate and filtering the lithium carbonate from the first pregnant leaching solution. More particularly, the first pregnant leaching solution is mixed with added carbon dioxide ($CO_2$) in the mixing tank 50 to produce the lithium carbonate. The lithium carbonate precipitates and is collected by the filter 52 for further processing into lithium metal in accordance with processes known in the art. The lixiviant recovered from the filter 48 is returned to the tanks $34_D$ and $36_D$ of the two counter current ammoniacal leaching and decanting circuits 34, 36 as shown.

The second pregnant leaching solution exiting the tank $36_D$ of the second counter current ammoniacal leaching and decanting circuit 36 is delivered to a graphite separator 54 adapted for separating and recovering the lighter graphite, including valuable anode grade graphite, from the second pregnant leaching solution. The second pregnant leaching solution, less the graphite, is then delivered from the separator 54 to (a) to a second pre-heater 56, adapted for heating the second pregnant leaching solution to evaporate the ammonia and then (b) to a second ammonia stripper 58 adapted for removing any residual ammonia following evaporation. The insoluble graphite, iron (Fe), aluminum (Al), manganese (Mn) and rare earth element (REEs) components, that are insoluble in the ammoniacal lixiviant, settle in the stripper 58 and are delivered to a filter (e.g. a filter belt) 60 where these solids are filtered from the lixiviant and recovered. A magnetic separator 62 may be used to separate the iron-rich components from the other solid components including aluminum, manganese, and rare earth element components. The soluble nickel (Ni), cobalt (Co), zinc (Zn) and copper (Cu) components in the second pregnant leaching solution are then routed through a second ammonia stripper 64 and then delivered to a solvent extraction circuit generally designated by reference numeral 66. The stripper 64 functions to further remove ammonia from the second pregnant leaching solution and minimize the amount of ammonia that will be loaded upon the extractant during subsequent solvent extraction.

The solvent extraction circuit 66 illustrated in FIG. 1 includes a series of five extraction tanks $66_A$, $66_B$, $66_C$, $66_D$, and $66_E$. In the first tank $66_A$, the second pregnant leaching solution, that is received from the stripper 64 is mixed with recycled second pregnant leaching solution received from the tank $66_E$ and all metal components are collected in the organic phase which is discharged to the second tank $66_B$ while the aqueous phase is routed to the condenser/absorber 67 to make up ammonia in the system. In the second tank $66_B$ of the circuit 66, the second pregnant leaching solution is subjected to a fresh water rinse to remove residual ammonia and reduce the pH to between about 4 and about 8. Once again the recovered ammonia is returned to the condenser/absorber 67 for lixiviant makeup.

The extraction of loaded elements then occurs in the following order of pH from highest to lowest: Ni>Co>Cu>Zn using di(2,4,4-trimethylpentyl)-phosphinic acid (such as Cyanex 272) or other acids. Here it should be noted that a phase modifier such as tri-n-butyl phosphate (TBP) may be needed to prevent the formation of a third phase in the solvent system at high pH.

More specifically, as shown the Ni component is stripped from the organic phase of the second pregnant leaching solution in the third tank $66_C$ by means of acid addition (e.g. hydrochloric acid (HCl)) to a pH range of between about 6 and about 0 and then delivered in aqueous solution to the mixing tank 68 where a base such as sodium hydroxide is mixed therewith to produce nickel hydroxide which is then recovered by filtration at the filter 78. The acid used for the stripping may be made up in the acid recirculation circuit generally designated by reference numeral 70.

The organic phase, less the nickel component, of the second pregnant leaching solution from the tank $66_C$ is then delivered to the tank $66_D$ where the pH is lowered once again by further acid addition to a pH range of between about 6 and about 0 in order to strip the cobalt component from the organic phase into the aqueous phase. As shown the aqueous phase with the stripped cobalt component is then delivered to an electrowinning device 72 for the recovery of cobalt metal while the organic phase, less the cobalt component, is transferred to the tank $66_E$.

The pH of the organic phase of the second pregnant leaching solution in the tank $66_E$ is lowered once again by further acid addition to a pH range of between about 4 and about −1 in order to strip the copper component from the organic phase into the aqueous phase. As shown the aqueous phase with the stripped copper component is then delivered to an electrowinning device 74 for the recovery of copper metal while the organic phase, less the copper component, is transferred to the next tank, which for purposes of simplification is also represented by tank $66_E$ in the drawing FIGURE. There the pH is once again lowered by the addition of acid to a pH range of between about 4 and about −1 until the zinc component is stripped from the organic phase into the aqueous phase. The aqueous phase with the stripped zinc is then transferred to another electrowinning device (also represented at 74 in the drawing FIGURE) for the recovery of zinc metal. The remaining organic phase is then recirculated back to the first tank $66_A$ as noted above.

As should be appreciated from the above description, the apparatus 10 includes (a) a condenser absorber 67 adapted for returning the ammonia evaporated from the first and second pregnant leaching solutions to the first and second counter current ammoniacal leaching and decanting circuits 34, 36, (b) a first recycling circuit 76 for recirculating the first pregnant leaching solution to the first counter current ammoniacal leaching and decanting circuit following the filtering of the lithium carbonate from the first pregnant leaching solution, (c) a second recycling circuit 78 for recirculating the second pregnant leaching solution to the lithium precipitating circuit following the filtering of the solid materials from the second pregnant leaching solution, and (d) a third recycling circuit 80 for recirculating the second pregnant leaching solution to the lithium precipitating circuit following filtering of nickel hydroxide from the second pregnant leaching solution.

The method and apparatus set forth in this disclosure may be said to refer to the following items.

1. A method of recycling batteries, comprising:
shredding the batteries to generate a shredded battery feed material;
wetting the shredded battery feed material with an ammonia carbonate lixiviant to generate a slurry;
separating the battery feed material in the slurry into a relatively light fraction material slurry and a relatively heavy fraction material slurry;
processing the relatively light fraction material slurry in a first counter current ammoniacal leaching and decanting circuit to produce a first pregnant leaching solution including a soluble lithium (Li) component; and
processing the relatively heavy fraction material slurry in a second counter current ammoniacal leaching and decanting circuit to produce a second pregnant leaching solution including, if present in the batteries, soluble nickel (Ni), cobalt (Co), zinc (Zn) and copper (Cu) components and insoluble graphite, iron (Fe), aluminum (Al), manganese (Mn) and rare earth element (REEs) components.

2. The method of item 1, further including removing ammonia from the first pregnant leaching solution.

3. The method of item 2, wherein the removing of the ammonia from the first pregnant leaching solution is performed by first heating the first pregnant leaching solution to evaporate the ammonia and then stripping residual ammonia following evaporation.

4. The method of item 3, further including precipitating the lithium component from the first pregnant leaching solution as lithium carbonate in a lithium precipitation circuit and filtering the lithium carbonate from the first pregnant leaching solution.

5. The method of item 4, including separating solid plastics from the first pregnant leaching solution before the precipitating of the lithium component.

6. The method of item 5, further including removing ammonia from the second pregnant leaching solution by first heating the lixiviant to evaporate the ammonia and then stripping residual ammonia following evaporation.

7. The method of item 6, further including separating graphite from the second pregnant leaching solution before the removing of the ammonia.

8. The method of item 7, including using floatation for the separating of the graphite from the heavy fraction material in the lixiviant.

9. The method of item 7, further including filtering or settling solid materials from the second pregnant leaching solution.

10. The method of item 9, further including using magnetic separation to separate iron-rich components from other solid materials including aluminum, manganese and rare earth element components.

11. The method of item 10, including removing further ammonia from the second pregnant leaching solution to lower the pH to a value of between about 7 and about 10.5 and then subjecting the second pregnant leaching solution to solvent extraction to sequentially extract the nickel component, the cobalt component, the copper component and the zinc component.

12. The method of item 11, including (a) stripping the nickel component from the second pregnant leaching solution with acid, (b) producing nickel hydroxide from the nickel component extracted from the second pregnant leaching solution and then (c) recovering the nickel hydroxide by filtering.

13. The method of item 11, including electrowinning cobalt metal from the cobalt component extracted from the second pregnant leaching solution.

14. The method of item 11, including stripping the copper component and the zinc component from the second leaching solution with acid and electrowinning copper and zinc metal from the copper component and the zinc component extracted from the second leaching solution.

15. The method of any of items 1-14, further including subjecting lithium ion batteries to reductive roasting prior to the wetting of the shredded battery feed material with an ammonia carbonate lixiviant.

16. The method of item 15, wherein the reductive roasting includes heating the lithium ion batteries to a temperature of between about 450° C. and 850° C. for a duration of time until the lithium ion batteries cease generating gasses.

17. The method of item 15, further including recirculating the first pregnant leaching solution to the first counter current ammoniacal leaching and decanting circuit following the filtering of the lithium carbonate from the first pregnant leaching solution.

18. The method of item 17, further including recirculating the second pregnant leaching solution to the lithium precipitating circuit following the filtering of the solid materials from the second pregnant leaching solution.

19. The method of item 18, further including recirculating the second pregnant leaching solution to the lithium precipitating circuit following the filtering of the nickel hydroxide from the second pregnant leaching solution.

20. The method of item 19, further including returning the ammonia removed from the first and second pregnant leaching solutions to the first and second counter current ammoniacal leaching and decanting circuits.

Each of the following terms written in singular grammatical form: "a" "an", and "the", as used herein, means "at least one", or "one or more". Use of the phrase "One or more" herein does not alter this intended meaning of "a", "an", or "the". Accordingly, the terms "a", "an", and "the", as used herein, may also refer to, and encompass, a plurality of the stated entity or object, unless otherwise specifically defined or stated herein, or, unless the context clearly dictates otherwise. For example, the phrase: "an acid", as used herein, may also refer to, and encompass, a plurality of acids.

Each of the following terms: "includes", "including", "has", "having", "comprises", and "comprising", and, their linguistic/grammatical variants, derivatives, or/and conjugates, as used herein, means "including, but not limited to", and is to be taken as specifying the stated component(s), feature(s), characteristic(s), parameter(s), integer(s), or step (s), and does not preclude addition of one or more additional component(s), feature(s), characteristic(s), parameter(s), integer(s), step(s), or groups thereof.

The phrase "consisting of", as used herein, is closed-ended and excludes any element, step, or ingredient not specifically mentioned. The phrase "consisting essentially of", as used herein, is a semi-closed term indicating that an item is limited to the components specified and those that do not materially affect the basic and novel characteristic(s) of what is specified.

Terms of approximation, such as the terms about, substantially, approximately, etc., as used herein, refers to ±10% of the stated numerical value.

Although the method and apparatus of recycling batteries of this disclosure have been illustratively described and presented by way of specific exemplary embodiments, and examples thereof, it is evident that many alternatives, modifications, or/and variations, thereof, will be apparent to those skilled in the art. For example, the nickel component may be recovered as a metal via electrowinning instead of as nickel hydroxide via neutralization and precititation as described above. Accordingly, it is intended that all such alternatives, modifications, or/and variations, fall within the spirit of, and are encompassed by, the broad scope of the appended claims.

What is claimed:

1. A method of recycling batteries, comprising:
   shredding the batteries to generate a shredded battery feed material;
   wetting the shredded battery feed material with an ammonia carbonate lixiviant to generate a slurry;
   separating the battery feed material in the slurry into a relatively light fraction material slurry and a relatively heavy fraction material slurry;
   processing the relatively light fraction material slurry in a first counter current ammoniacal leaching and decanting circuit to produce a first pregnant leaching solution including a soluble lithium (Li) component; and
   processing the relatively heavy fraction material slurry in a second counter current ammoniacal leaching and decanting circuit to produce a second pregnant leaching solution including, if present in the batteries, soluble nickel (Ni), cobalt (Co), zinc (Zn) and copper (Cu) components and insoluble graphite, iron (Fe), aluminum (Al), manganese (Mn) and rare earth element (REEs) components.

2. The method of claim 1, further including removing ammonia from the first pregnant leaching solution.

3. The method of claim 2, wherein the removing of the ammonia from the first pregnant leaching solution is performed by first heating the first pregnant leaching solution to evaporate the ammonia and then reabsorbing the evaporated ammonia in water.

4. The method of claim 3, further including precipitating the lithium component from the first pregnant leaching solution as lithium carbonate in a lithium precipitation circuit and filtering the lithium carbonate from the first pregnant leaching solution.

5. The method of claim 4, further including recirculating the first pregnant leaching solution to the first counter current ammoniacal leaching and decanting circuit following filtering of the lithium carbonate from the first pregnant leaching solution.

6. The method of claim 5, further including recirculating the second pregnant leaching solution to lithium precipitating circuit following the filtering of the solid materials from the second pregnant leaching solution.

7. The method of claim 4, including separating solid plastics from the first pregnant leaching solution before the precipitating of the lithium component.

8. The method of claim 7, further including removing ammonia from the second pregnant leaching solution by first heating the second pregnant leaching solution to evaporate the ammonia and then reabsorbing the evaporated ammonia in cooling water.

9. The method of claim 8, further including separating graphite from the second pregnant leaching solution before the removing of the ammonia.

10. The method of claim 9, including using floatation for the separating of the graphite from a heavy fraction material in the lixiviant.

11. The method of claim 9, further including filtering or settling solid materials from the second pregnant leaching solution.

12. The method of claim 11, further including using magnetic separation to separate iron-rich components from the second pregnant leaching solution.

13. The method of claim 12, including removing further ammonia from the second pregnant leaching solution to lower the pH to a value of between about 7 and about 10.5 and then subjecting the second pregnant leaching solution to solvent extraction to sequentially extract the nickel component, the cobalt component, the copper component and the zinc component.

14. The method of claim 13, including (a) stripping the nickel component from the second pregnant leaching solution with acid, (b) producing nickel hydroxide from the nickel component extracted from the second pregnant leaching solution and then (c) recovering the nickel hydroxide by filtering.

15. The method of claim 14, further including recirculating the second pregnant leaching solution to the lithium precipitating circuit following filtering of the nickel hydroxide from the second pregnant leaching solution.

16. The method of claim 15, further including returning ammonia removed from the first and second pregnant leaching solutions to the first and second counter current ammoniacal leaching and decanting circuits.

17. The method of claim 13, including electrowinning cobalt metal from the cobalt component extracted from the second pregnant leaching solution.

18. The method of claim 13, including stripping the copper component and the zinc component from the second leaching solution with acid and electrowinning copper and zinc metal from the copper component and the zinc component extracted from the second leaching solution.

19. The method of claim 1, further including subjecting lithium ion batteries to reductive roasting prior to the wetting of the shredded battery feed material with an ammonia carbonate lixiviant.

20. The method of claim 19, wherein the reductive roasting includes heating the lithium ion batteries to a temperature of between about 450° C. and 850° C. for a duration of time until the lithium ion batteries cease generating gasses.

\* \* \* \* \*